United States Patent [19]
Schiraldi

[11] Patent Number: 5,922,828
[45] Date of Patent: Jul. 13, 1999

[54] PROCESS FOR PRODUCING POLYETHYLENE TEREPHTHALATE USING A SPECIFIC CATALYST STABILIZER SYSTEM

[75] Inventor: David Anthony Schiraldi, Charlotte, N.C.

[73] Assignee: Hoechst Celanese Corp., Somerville, N.J.

[21] Appl. No.: 08/910,754

[22] Filed: Aug. 13, 1997

Related U.S. Application Data

[63] Continuation-in-part of application No. 08/706,950, Sep. 3, 1996, abandoned.

[51] Int. Cl.[6] ............................................. C08G 63/78
[52] U.S. Cl. ..................... 528/279; 528/287; 528/302; 528/307; 528/308; 528/308.6; 524/115; 524/128; 524/129; 524/147
[58] Field of Search .................... 528/279, 287, 528/302, 307, 308, 308.6; 524/115, 128, 129, 147

[56] References Cited

U.S. PATENT DOCUMENTS

| | | | |
|---|---|---|---|
| 3,321,444 | 5/1967 | Hoyer et al. ............................. | 260/75 |
| 3,404,121 | 10/1968 | Barkey ..................................... | 260/45.7 |
| 3,907,754 | 9/1975 | Tershansy et al. ....................... | 260/75 |
| 3,962,189 | 6/1976 | Russin et al. ............................ | 260/75 |
| 4,010,145 | 3/1977 | Russin et al. ............................ | 260/75 |
| 4,356,299 | 10/1982 | Cholod et al. ........................... | 528/279 |
| 4,357,461 | 11/1982 | Go et al. .................................. | 524/724 |
| 4,361,681 | 11/1982 | Bernhardt ................................. | 525/444 |
| 5,017,680 | 5/1991 | Sublett ..................................... | 528/274 |
| 5,106,892 | 4/1992 | Chiolle et al. ........................... | 524/120 |
| 5,236,979 | 8/1993 | Chiolle et al. ........................... | 524/120 |

FOREIGN PATENT DOCUMENTS

| | | |
|---|---|---|
| 0699700 | 6/1996 | European Pat. Off. . |
| 19518943 | 11/1996 | Germany . |
| 2109387 | 2/1983 | United Kingdom . |
| WO9213021 | 6/1992 | WIPO . |
| WO9503347 | 2/1995 | WIPO . |

OTHER PUBLICATIONS

Chemical Abstract. 114:208092 of JP Kokai 02 302 432 (Dec. 14, 1990).
Chemical Abstract. 93:95889 of JP Kokai 55 056 121 (Apr. 24, 1980).
Chemical Abstract. 124:30698 of JP Kokai 07 242 742 (Sep. 19, 1995).

*Primary Examiner*—Samuel A. Acquah
*Attorney, Agent, or Firm*—Gregory N. Clements

[57] ABSTRACT

A novel process to produce polyethylene terephthalate (PET) using a specific catalyst stabilizer system is described. The catalyst stabilizer system is specific for producing PET wherein the polycondensation catalyst is a titanium and the stabilizer possesses an irreversible oxidation potential of at least +2.0 volts versus SCE. The novel process results in PET having acceptable color and low acetaldehyde content.

34 Claims, No Drawings

PROCESS FOR PRODUCING POLYETHYLENE TEREPHTHALATE USING A SPECIFIC CATALYST STABILIZER SYSTEM

This application is a continuation-in-part of application Ser. No. 08/706,950, filed Sep. 3, 1996 now abandoned.

FIELD OF THE INVENTION

The present invention relates to a process for producing polyethylene terephthalate (PET) using a specific catalyst/stabilizer system which results in lower acetaldehyde content. In particular, the combination of the stabilizer and the catalyst includes a titanium polycondensation catalyst and a hindered phosphite stabilizer.

PRIOR ART

Polyethylene terephthalate is prepared by one of two processes, namely: (1) the DMT process and (2) the TA process. In the DMT process, dimethyl terephthalate (DMT) is reacted with ethylene glycol in an ester interchange reaction (transesterification) to yield bis(2-hydroxyethyl) terephthalate (monomer) and methanol. Because the reaction is reversible, it is necessary to remove the methanol to completely convert the raw materials into monomer. It is known to use magnesium and/or cobalt and/or zinc in the ester interchange reaction. The catalyst activity is then sequestered by introducing phosphorus, for example in the form of polyphosphoric acid (PPA), at the end of the ester interchange reaction. The monomer then undergoes a condensation reaction (polycondensation) which polymerizes the monomer to PET. When the monomer undergoes polycondensation, the catalyst most frequently employed is antimony. If the catalyst employed in the ester interchange reaction is not arrested with phosphorus, the resultant polymer easily degrades (thermodegradation) and has a very unacceptable yellow color.

The second method for making PET is to react terephthalic acid (TA) and ethylene glycol by a direct esterification reaction producing bis(2-hydroxyethyl) terephthalate and oligomers and water. This reaction is also reversible and thus can be carried to completion by removing the water during the reaction. The direct esterification step does not require a catalyst and conventionally no catalyst is employed. Just as in the DMT process, the monomer then undergoes polycondensation to form PET. The polycondensation reaction typically uses antimony as a catalyst.

In summary, if the DMT process is employed to make PET, there are two steps, namely: (1) ester interchange and (2) polycondensation. The ester interchange catalyst's activity is arrested at the end of the first step by introducing phosphorus. If the TA process is employed to make PET, there are also two steps, namely: (1) direct esterification and (2) polycondensation. Generally, no catalyst system is employed in the direct esterification step. In both processes, antimony is the preferred catalyst in the polycondensation step.

Acetaldehyde is an unwanted byproduct in the manufacture of PET, which can be produced by the degradation of ethylene glycol or by the degradation of the PET polymer chain. The degradation of PET during its processing to produce acetaldehyde is well described in the literature.

It is well known in the art that PET constitutes a valuable material for the packaging of food products, especially in the form of bottles intended for the storing of carbonated beverages. It is essential that a catalyst be used which are fast enough to provide a transesterification rate (when this type of ester-forming reaction is employed) and polycondensation rate to be commercially attractive and to minimize by-products and side reactions which are inherent with slow transesterification and polycondensation. Another essential property which packaging material fabricated from PET must possess is the absence of any compound or additive which is capable of migrating into the food product or drink and of impairing its taste or smell.

It is known that PET resins release acetaldehyde by degradation and thus possess a smell and a characteristic taste which appear even at extremely low concentrations of acetaldehyde. The aforesaid problem is particularly significant and acute in bottling of mineral water and carbonated beverages. Thus, polyester bottles intended for mineral water and carbonated beverages must contain no more than a very low concentration of acetaldehyde.

The maximum acceptable level of acetaldehyde in a polyester bottle is set by the manufacturer of a given product and can be higher or lower depending on the specific product being bottled. Therefore, any process or technique which will further reduce the acetaldehyde concentration in a PET bottle would be desirable and an advantage to those who package their products in polyester bottles. The amount of the acetaldehyde present in the finished shaped article depends both on the residual amount present in the polyester granules before they are converted and on the amount formed from the conversion to the molten state and to a finished article. It has been known to use stabilizers, such as phosphorus compounds, and catalysts, including compounds of magnesium, zinc, calcium antimony, cobalt and titanium and alkaline earth metal salts, in PET.

It is known in the art that the titanium catalyzed reaction of DMT and ethylene glycol provides fast polycondensation rates for PET. It is also well known in the art that the use of titanium as a catalyst for the production of PET results in a yellow colored polymer. Therefore, to be a useful product, titanium catalyzed PET has been modified with a color inhibitor or stabilizer, such as a phosphorous compound, and/or with yellowness-masking cobalt compounds or blue toner pigments.

U.S. Pat. No. 3,321,444 discloses processes for manufacturing PET using a catalyst of a complex alkali metal titanyl oxalate plus a phosphorous compound such as a triphenyl phosphite without loss of catalytic activity or degradation of color of the PET.

U.S. Pat. No. 3,907,754 discloses catalyst inhibitor system containing titanium, manganese, cobalt and phosphorus for PET which provides a fast reaction rate and polymer with good color. This patent does not disclose the hindered phosphite of the present invention.

U.S. Pat. No. 3,962,189 discloses manganese, titanium, cobalt, phosphorus plus an alkali metal salt which is used to produce PET with fast reaction rate, good color and an alkali metal salt in low concentration (2 to 32 ppm) to prevent batho-chromic dye shift when the polyester is spun into fiber and dyed.

U.S. Pat. No. 4,010,145 discloses a manganese, titanium, cobalt, phosphorus, antimony catalyst inhibitor system for producing a PET at a fast rate with good color. There is no hindered phosphite in this patent.

U.S. Pat. No. 4,356,299 discloses a titanium, antimony, manganese, cobalt and phosphorus catalyst/stabilizer system for producing PET at fast rate with good color. This patent is for reduced titanium concentration to provide good color and fast reaction time and does not address acetaldehyde generation.

U.S. Pat. No. 4,357,461 discloses the use of an alkali metal salt of ethylenediaminetetraacetic acid to reduce the acetaldehyde generation rate inherent in melt processing of PET for packaging. However the patent does not address the use of titanium catalyzed PET.

U.S. Pat. No. 4,361,681 discloses the use of dicarboxylic acid anhydrides to reduce acetaldehyde in the preparation and processing of PET for packaging end uses, namely bottles. The patent addresses post treatment of previously prepared polymer to reduce hydroxyethyl end groups and thus reduce acetaldehyde.

U.S. Pat. No. 5,017,680 is directed to a process to make PET including 10 mole % of 1 cyclohexanedimethanol and using catalyst of manganese, cobalt, antimony, phosphorus, and a complex of titanium oxide. However, no mention is made of the combination of titanium as in the present invention.

SUMMARY OF THE INVENTION

The present invention relates to a novel catalyst/stabilizer system which is effective in producing PET with reduced acetaldehyde content and acceptable color and, more particularly, to a process for producing PET using such a catalyst/stabilizer system.

In the broadest sense, the present invention comprises catalyst/stabilizer systems specific for producing polyesters from ethylene glycol, especially PET, wherein the catalyst includes a titanium polycondensation catalyst and the stabilizer possesses an irreversible oxidation potential of at least +2.0 volts versus the standard calomel electrode (SCE). The preferred catalyst is titanium in the form of an orthoester such as tetrabutyltitanate or tetraisopropyltitanate. The preferred stabilizer used in the invention is a hindered phosphite, bis(2,4-di-tert-butylphenyl)-pentaerythritol diphosphite.

DESCRIPTION OF THE INVENTION

The present invention provides a catalyst/stabilizer system for PET which results in a reduced acetaldehyde generation rate and acceptable color. It is surprising and unexpected that this can be achieved by using a catalyst/stabilizer system comprised of titanium and a stabilizer possessing an irreversible oxidation potential of at least +2.0 volts versus the standard calomel electrode (SCE).

Polyester for the present invention is prepared from one or more aromatic dicarboxylic acids or dicarboxylic acid esters and ethylene glycol. More particularly, PET for the present invention is prepared from terephthalic acid and ethylene glycol or from dimethyl terephthalate and ethylene glycol. As is known in the art, PET having modified properties, such as reduced crystallinity, can be obtained by including minor amounts of modifying reactants, such as isophthalic acid (IPA) or its esters, diethylene glycol (DEG) or cyclohexanedimethanol or any combination thereof. Preferably the total amount of such modifying reactant(s), more particularly the total amount of all ester-forming reactants other than terephthalic acid, dimethyl terephthalate and ethylene glycol, is no greater than 10%, by weight, based on the expected (i.e., theoretical) yield of the polymer.

The present invention may be used to produce PET using either a continuous process or a batch process both of which are well known in the art.

In a conventional batch process, PET is made by reacting two components in a molar ratio of ethylene glycol to terephthalic acid in the range from 1.2:1 to 2.0:1, e.g., about 1.5:1, at a pressure range of about 5 psia to about 85 psia and at a temperature range of about 185° C. to about 290° C., preferably 185 to 240° C., more preferably 185 to 225° C., for about 1–5 hours. The reaction, known as the direct esterification stage, does not require a catalyst. The products formed are monomer and water. The use of a slight excess of ethylene glycol and the removal of water as the reaction proceeds allows for the normally reversible reaction to proceed to completion. Another batch process comprises reacting ethylene glycol and dimethyl terephthalate under similar conditions but preferably at a glycol:terephthalate mole ratio from about 1.8:1 to 2.2:1, preferably 2.0:1 to 2.1:1 and, as disclosed above, in the presence of a catalyst and with removal of methanol. The second stage of a conventional batch process involves polymerization of the monomer at a pressure range of 0 to 40 mm Hg at a temperature range of about 205° C. to about 305° C., preferably 205 to 285° C., more preferably 205 to 270° C., for approximately 1–4 hours. This stage, normally described as the polycondensation stage, forms PET. The polycondensation stage conventionally employs a catalyst as well as other additives such as brighteners, bluing agents, color pigments, opaqueing agents and thermal stabilizers.

The conventional continuous process is basically an extension of the batch process in which a series of two or more sequentially connected vessels are used to perform the esterification and polycondensation reactions. In general, a continuous feed of raw materials is used employing a molar ratio of ethylene glycol to terephthalic acid or dimethyl terephthalate of about 1:1 to about 1.6:1 or about 1.8:1 to 2.2:1, respectively. Again, the water or methanol formed as a by-product is removed as the reaction proceeds to enable the reaction to proceed to completion. The first vessel in the process is generally at a pressure range of 0 to 70 psig with the pressure in each successive vessel decreasing to the final polymerization vessel which is generally at a pressure range of 0 to 40 mm Hg. Higher pressures in the final polymerization vessel are indicative of more reactive polymer processes when other conditions are held constant. The temperature range through the series of vessels generally increases from 185° C. to 290° C., preferably 185 to 240° C., more preferably 185 to 225° C., in the first vessel to 205° C. to 305° C., preferably 205 to 285° C., more preferably 205 to 270° C., in the last vessel. The increase in temperature and the decrease in pressure aid the removal of excess ethylene glycol and force the reaction equilibrium to higher molecular weights. The flow of the reactant stream is continuous through each vessel and from vessel to vessel. In addition, the output of PET is continuous. In the continuous process there is generally no direct esterification catalyst employed. However the polycondensation catalyst may be introduced into the first vessel with the raw materials or into a vessel further along in the process prior to or during polycondensation but after the direct esterification stage is completed.

As is known in the art, when a modifying reactant is used as discussed above, it may be added for reaction during either stage of the polyester-making process. The exact point of addition is not critical to the present invention and the most appropriate point will be recognized by a person skilled in the art depending on the particular situation. The amount of modifying reactant, be it an acid, ester or diol, is taken into consideration to satisfy the aforementioned mole ratios, i.e., by using less ethylene glycol to offset the amount of DEG and/or cyclohexane dimethanol or less TA or DMT to offset the amount of IPA or ester thereof.

The present invention differs from the conventional system in that the catalyst stabilizer system is made up of a titanium catalyst and a hindered phosphite stabilizer. The catalyst stabilizer system of the present invention reduces the acetaldehyde content of the PET and does not adversely affect the color of the PET.

The simplest catalyst system of the present invention comprises titanium in the range from about 5 ppm to about 30 ppm. It is believed that any known titanium polycondensation catalyst is suitable. Examples of suitable titanium catalysts are titanium salts, such as alkali metal titanium oxalates, preferably potassium titanium oxalate, and compounds of the formula:

$TiX_4$ wherein
- each X, independently, is —OR or —NR'$_2$
- each R, independently, is alkyl or aryl, preferably $C_{1-10}$ alkyl or substituted or unsubstituted phenyl, more preferably $C_{3-4}$ alkyl,
- each R', independently, is hydrogen, —SiR"$_3$ or a significance of R as defined above and
- each R", independently, is a significance of R as defined above.

catalysts are titanium orthoesters, especially tetrabutyltitanate (TBT) and tetraisopropyltitanate. Examples of such catalyst are the Tyzor® products of DuPont.

Preferably, no polycondensation catalyst other than a titanium catalyst is employed in a process according to this invention.

The stabilizer used in the catalyst/stabilizer system is preferably a hindered phosphite, more preferably bis(2,4-di-tert-butylphenyl) pentaerythritol diphosphite. This stabilizer is available from General Electric as Ultranox®-626 and Ultranox®-627A. The range used is from about 100 ppm to about 3000 ppm.

The aforementioned ppm of titanium and stabilizer are parts per million by weight based on the total polymer weight, i.e, on the total expected weight of polymer to be produced, which is the theoretical yield.

The method used for calculating the catalyst metal and stabilizer concentrations in unmodified PET for purposes of this specification may be illustrated as follows: The polymer's repeat empirical formula is $C_{10}H_8O_4$ and its gram molecular weight thus is 192.16 g. The PET is prepared in a 4.00 mole batch which yields 769 grams. Catalyst metal levels are reported in parts by weight of metal per million parts by weight of polymer. Thus 1000 grams of polymer product using 0.142 grams of Ti(OC$_4$H$_9$)$_4$ contains 0.02 grams of Ti and is said to be catalyzed by 20 ppm titanium. Accordingly, one wishing to employ 20 ppm of Ti based on the total polymer weight (i.e., the expected theoretical yield) of unmodified PET having the aforementioned repeat empirical formula will use 0.142 g of Ti (OC$_4$H$_9$)$_4$ per 1000 g of expected theoretical yield of the polymer. The amount of stabilizer to be used is determined in an analogous manner, as are the amounts of catalyst and stabilizer for modified PET based on its particular repeat empirical formula.

All polymers in the following examples are subjected to analysis of acetaldehyde. Weighted samples of the polymer were heated for 90 minutes at 160° C. in a septum capped vial. The headspace in the vial was analyzed by gas chromatography using a Porapak QS column run at 110° C., and flame ionization detection. The results are reported in parts per million based on the weight of the polymer.

The invention has been described in detail with particular reference to preferred embodiments thereof, but it will be understood that various modifications can be effected within the spirit and scope of the invention.

In all of the following examples the polycondensation reaction was carried out until the polymer had an intrinsic viscosity of 0.65 as described in Comparative Example C1.

EXPERIMENTATION

Comparative Examples C-1 to C-6

C-1: DMT (737.9 g, 3.8 moles), EG (395.5 g, 8.0 moles), Sb$_2$O$_3$ (0.322 g, 350 ppm Sb in polymer), and Mn(OAc)$_2$ (0.205 g, 60 ppm Mn in polymer) were charged to a 2 liter laboratory autoclave equipped with a reflux column/volatiles takeoff, a vacuum adaptor and source, and an anchor-type agitator. The external heat source was set to 230° C, and the internal agitator was started (approximately 10 rpm). Over a period of 2 hours, 298 mL of methanol was collected overhead, with the reaction melt temperature reaching a final temperature of 225° C. At the end of the methanol takeoff, 0.124 g of polyphosphoric acid (PPA)(60 ppm P in the polymer) was added to the reactor. After waiting 5 additional minutes, 49.8 g of a 60%/40% w/w slurry of EG and IPA was added to the reactor. The setpoint of the external heater was increased to 280° C., and vacuum was slowly applied to the autoclave. Over 90 minutes, EG was removed overhead, and a pressure of 0.2 Torr was achieved in the autoclave. The 0.2 Torr was maintained for an additional period of 3.5 hours, removing additional EG as the polymerization process continued. At the end of the polymerization, vacuum was replaced with a slight positive pressure of nitrogen, a bottom valve on the reactor was opened, and the molten polymer was extruded into water. A final intrinsic viscosity of 0.65 at 25° C. at a concentration of 4% by weight in orthochlorophenol was obtained for this polymer. The results of this and other comparative examples are shown in Table I.

C-2: The procedure of C-1 was repeated, adding 1.53 g (0.2 wt %) of Ultranox®-626 hindered phosphite to the autoclave at the end of methanol takeoff, in addition to the other additives.

C-3: The procedure of C-1 was repeated, adding 1.53 g (0.2 wt %) of Tinuvin® 234 benzotriazole to the autoclave at the end of methanol takeoff, in addition to the other additives.

C-4: The procedure of C-1 was repeated, adding 1.53 g (0.2 wt %) of Ultranox 627A® hindered phosphite to the autoclave at the end of methanol takeoff, in addition to the other additives.

C-5: The procedure of C-1 was repeated, adding 1.53 g (0.2 wt %) of Irganox® 1010 hindered phenol to the autoclave at the end of the methanol takeoff, in addition to the other additives.

C-6: The procedure of C-1 was repeated, adding 1.53 g (0.2 wt %) of Cyasorb® 3346 hindered amine to the autoclave at the end of methanol takeoff, in addition to the other additives.

TABLE I

| ppm added | | | | | | | Acetaldehyde |
|---|---|---|---|---|---|---|---|
| Sb | Mn | Ti | Temp | Stabilizer | Color | | Resid |
| C-1 350 | 60 | 0 | 280 | None | White/A | | 29 |
| C-2 350 | 60 | 0 | 280 | 0.2% Ultranox | Gray/U | | 21 |

TABLE I-continued

| | ppm added | | | Temp | Stabilizer | Color | Acetaldehyde Resid |
|---|---|---|---|---|---|---|---|
| | Sb | Mn | Ti | | | | |
| C-3 | 350 | 60 | 0 | 280 | 0.2% Tinuvin 234 | Yellow/U | 39 |
| C-4 | 350 | 60 | 0 | 280 | 0.2% Ultranox 627A | Gray/U | 18 |
| C-5 | 350 | 60 | 0 | 280 | 0.2% Irganox 1010 | Yellow/U | 32 |
| C-6 | 350 | 60 | 0 | 280 | 0.2% Cyasorb 3346 | Yellow/U | 75 |

(Color: A = acceptable; U = unacceptable)

The data in Table I shows that while Ultranox® 626 and 627A can reduce acetaldehyde levels in PET, the resultant polymers are unacceptable being gray in color.

Example 1

The procedure of Comparative Example C-2 was repeated, except that the $Sb_2O_3$ was replaced with 0.162 g of tetrabutyl titanate (30 ppm Ti on the expected weight of the polymer) and 0.062 g of PPA (30 ppm P on the expected weight of the polymer) was used. An intrinsic viscosity of 0.65 was achieved in a polymerization time of 4 hours at 0.2 Torr and 270° C.) instead of 280° C.) and the resulting polymer was yellow green in color and had a residual acetaldehyde of 15 ppm by weight.

Example 2

The procedure of Example 1 was repeated, except that the $Mn(OAc)_2$ was replaced with 0.196 g of cobalt acetate (60 ppm on the expected weight of the polymer). The resulting polymer was clear yellow in color and had a residual acetaldehyde content of 24 ppm by weight.

Comparative Examples C-7 to C-8

C-7: In a modification of the procedure of Comparative Example C-1, bis(hydroxyethyl) terephthalate (1016.8 g, 4.0 moles) was charged to the autoclave, with 0.322 g of $Sb_2O_3$ (350 ppm Sb in the polymer) and 0.124 g of PPA (60 ppm P in the polymer). The external heat source was set to 280° C., vacuum was reduced to 0.2 Torr over 30 minutes, and the polymer was polymerized to 0.65 I.V. as in Comparative Example C-1.

C-8: The procedure of Comparative Example C-7 was repeated, replacing the $Sb_2O_3$ with 0.081 g of TBT (15 ppm Ti in the polymer) and omitting the PPA.

Example 3

The procedure of Comparative Example C-8 was repeated, adding 1.54 g (0.2 wt %) of Ultranox®-626 hindered phosphite to the autoclave at the start of the polymerization.

Results of Comparative Examples C7–C8 and Example 3 are shown in Table II.

TABLE II

| | PPM in Polymer | | | | | Acetaldehyde |
|---|---|---|---|---|---|---|
| Example | Sb | Ti | Co | P (PPA) | Ultranox-626 | Resid |
| C-7 | 350 | 0 | 0 | 60 | 0 | 50 |
| C-8 | 0 | 15 | 0 | 0 | 0 | 22 |
| 3 | 0 | 15 | 0 | 0 | 0.2% | 12 |

The data in Table II shows that while titanium catalyst can be used to reduce acetaldehyde levels in PET (vs. antimony catalyzed system) Ultranox® can further reduce acetaldehyde levels in conjunction with titanium catalyst.

Example

The irreversible oxidation potentials for the candidate stabilizers shown in the above examples were measured by cyclic voltammetry at 10 mM concentration in 0.1 molar lithium perchlorate/acetonitrile solution and are given in Table III.

TABLE III

| Stabilizer | Irreversible Oxidatation Potential | Effect on Acetaldehyde |
|---|---|---|
| Cyasorb 3346 | +0.8 V vs. SCE | None |
| Tinuvin 234 | +1.5 V vs. SCE | None |
| Irganox 1010 | +1.5 V vs. SCE | None |
| Ultranox 626 | +2.0 V vs. SCE | Reduced levels |
| Ultranox 627A | +2.0 V vs. SCE | Reduced levels |

Irreversible oxidation potentials measured using cyclic voltammetry in 0.1M lithium perchlorate/acetonitrile solution vs. the standard calomel electrode.

The data in Table III, along with the results of Tables I and II, shows that only those stabilizers with irreversible oxidation potentials of at least +2.0 volts are capable of reducing acetaldehyde levels in the polymers. Those stabilizers with lower oxidation potentials were generally ineffective at acetaldehyde reduction.

What is claimed is:

1. A process for producing a polyethylene terephthalate in the presence of a catalyst stabilizer system comprising a titanium polycondensation catalyst in an amount effective to provide from about 5 to 30 ppm of titanium, and a stabilizer which possesses an irreversible oxidation potential of at least +2.0 volts versus the standard calomel electrode in the amount of 100 to 3000 ppm wherein the ppm are parts per million by weight based on the total polymer weight.

2. The process of claim 1 wherein the titanium polycondensation catalyst is tetrabutyl titanate.

3. The process of claim 1 wherein the titanium polycondensation catalyst is tetraisopropyl titanate.

4. The process of claim 1 wherein the stabilizer is a hindered phosphite.

5. The process of claim 1 wherein the stabilizer is bis(2,4-di-tert-butylphenyl)pentaerythritol diphosphite.

6. The process of claim 2 wherein the stabilizer is bis(2,4-di-tert-butylphenyl)pentaerythritol diphosphite.

7. The process of claim 3 wherein the stabilizer is bis(2,4-di-tert-butylphenyl)pentaerythritol diphosphite.

8. A process for producing a polyester which comprises the steps of forming a monomer by a direct esterification reaction of reactants comprising an aromatic dicarboxylic acid and ethylene glycol or a transesterification reaction of reactants comprising an aromatic dicarboxylic acid ester and ethylene glycol and reacting the monomer in a polycondensation reaction in the presence of a catalyst/stabilizer system comprising a titanium polycondensation catalyst and a stabilizer which possesses an irreversible oxidation potential of at least +2.0 volts versus the standard calomel electrode, said catalyst being present in an amount effective to provide from about 5 to about 30 parts per million of titanium, by weight, and said stabilizer being present in an amount in the range 100 to 3000 parts per million, by weight, each of said parts per million being based on the total polymer weight.

9. A process according to claim 8 wherein the catalyst is in the form of an orthoester or an alkali metal titanium oxalate.

10. A process according to claim 9 wherein the catalyst is tetrabutyl titanate or tetraisopropyl titanate.

11. A process according to claim 10 wherein the catalyst is tetrabutyl titanate.

12. A process according to claim 11 wherein the stabilizer is bis(2,4-di-tert-butylphenyl) pentaerythritol diphosphite.

13. A process according to claim 10 wherein the stabilizer is bis(2,4-di-tert-butylphenyl) pentaerythritol diphosphite.

14. A process according to claim 9 wherein the stabilizer is a hindered phosphite.

15. A process according to claim 8 for producing polyethylene terephthalate wherein the aromatic dicarboxylic acid is terephthalic acid and the aromatic dicarboxylic acid ester is dimethyl terephthalate.

16. A process according to claim 15 wherein the catalyst is in the form of an orthoester.

17. A process according to claim 16 wherein the catalyst is tetrabutyl titanate or tetraisopropyl titanate.

18. A process according to claim 17 wherein the catalyst is tetrabutyl titanate.

19. A process according to claim 15 wherein at least one modifying reactant selected from the group consisting of isophthalic acid, diethylene glycol and cyclohexane dimethanol is reacted in the transesterification or direct esterification reaction or in the polycondensation reaction.

20. A process according to claim 15 wherein the total amount of ester-forming reactants other than terephthalic acid, dimethyl terephthalate and ethylene glycol is no greater than 10% by weight of the polymer.

21. A process according to claim 20 wherein the catalyst is a titanium salt or a compound of the formula $$TiX_4$$

wherein each X, independently, is —OR or —NR'$_2$, each R, independently, is $C_{1-10}$alkyl or substituted or unsubstituted phenyl, each R', independently, is hydrogen, SiR"$_3$ or a significance of R as defined above, and each R", independently, is a significance of R as defined above, and the stabilizer is a hindered phosphite.

22. A process according to claim 15 wherein the catalyst is a titanium salt or a compound of the formula $$TiX_4$$

wherein each X, independently, is —OR or —NR'$_2$, each R', independently, is $C_{1-10}$alkyl or substituted or unsubstituted phenyl, each R', independently, is hydrogen, SiR"$_3$ or a significance of R as defined above, and each R", independently, is a significance of R as defined above, and the stabilizer is a hindered phosphite.

23. A process according to claim 8 wherein the catalyst is a titanium salt or a compound of the formula $$TiX_4$$

wherein each X, independently, is —OR or —NR'$_2$, each R, independently, is alkyl or aryl, each R', independently, is hydrogen, SiR"$_3$ or a significance of R as defined above, and each R", independently, is a significance of R as defined above, and the stabilizer is a hindered phosphite.

24. A process according to claim 23 wherein no polycondensation catalyst other than a titanium catalyst is employed.

25. A process according to claim 1 wherein the catalyst is a titanium salt or a compound of the formula $$TiX_4$$

wherein each X, independently, is —OR or —NR'$_2$, each R, independently, is alkyl or aryl, each R', independently, is hydrogen, SiR"$_3$ or a significance of R as defined above, and each R", independently, is a significance of R as defined above, and the stabilizer is a hindered phosphite.

26. A process according to claim 25 wherein no polycondensation catalyst other than a titanium catalyst is employed.

27. A process for producing polyethylene terephthalate wherein said process is carried out in the presence of a catalyst stabilizer system comprising a titanium polycondensation catalyst and a stabilizer which possesses an irreversible oxidation potential of at least +2.0 volts versus the standard calomel electrode.

28. A process according to claim 27 wherein the catalyst is tetrabutyl titanate or tetraisopropyl titanate and the stabilizer is a hindered phosphite.

29. A process according to claim 1 which comprises reacting ethylene glycol with terephthalic acid to produce bis(2-hydroxyethyl) terephthalate and polycondensing the bis(2-hydroxyethyl) terephthalate in the presence of the titanium polycondensation catalyst and the stabilizer.

30. A process according to claim 29 wherein the titanium polycondensation catalyst is in the form of an orthoester and the stabilizer is a hindered phosphite.

31. A process according to claim 30 wherein the titanium polycondensation catalyst is tetrabutyl titanate or tetraisopropyl titanate and the hindered phosphite is bis(2,4-di-tert.-butylphenyl) pentaerythritol diphosphite.

32. A process according to claim 1 which comprises reacting ethylene glycol with dimethyl terephthalate to produce bis(2-hydroxyethyl) terephthalate and polycondensing the bis(2-hydroxyethyl) terephthalate in the presence of the titanium polycondensation catalyst and the stabilizer.

33. A process according to claim 32 wherein the titanium polycondensation catalyst is in the form of an orthoester and the stabilizer is a hindered phosphite.

34. A process according to claim 33 wherein the titanium polycondensation catalyst is tetrabutyl titanate or tetraisopropyl titanate and the hindered phosphite is bis(2,4-di-tert.-butylphenyl) pentaerythritol diphosphite.

* * * * *